United States Patent [19]

Lüdemann et al.

[11] Patent Number: 5,112,930
[45] Date of Patent: May 12, 1992

[54] MODIFIED POLYURETHANES CONTAINING PERFLUOROALIPHATIC GROUPS AND USE THEREOF

[75] Inventors: Simpert Lüdemann, Bobingen; Michael Bernheim, Aystetten; Bernhard Sandner, Diedorf; Erich Rössler, Stadtbergen-Leitershofen; Hans-Burkhardt Vogel, Brombach, all of Fed. Rep. of Germany

[73] Assignee: Ciba-Geigy Corporation, Ardsley, N.Y.

[21] Appl. No.: 667,721

[22] Filed: Mar. 11, 1991

Related U.S. Application Data

[62] Division of Ser. No. 301,681, Jan. 25, 1989, Pat. No. 5,019,428.

[30] Foreign Application Priority Data

Jan. 29, 1988 [DE] Fed. Rep. of Germany ....... 3802633
Sep. 16, 1988 [DE] Fed. Rep. of Germany ....... 3831452

[51] Int. Cl.$^5$ ............................................. C08G 77/04
[52] U.S. Cl. ............................. 528/28; 528/18; 528/21; 528/26; 525/440; 525/446; 525/453
[58] Field of Search ............... 528/28, 26, 18, 21; 525/446, 453, 440

[56] References Cited

U.S. PATENT DOCUMENTS

| 3,968,066 | 7/1976 | Mueller | 260/29.6 |
|---|---|---|---|
| 4,054,592 | 10/1977 | Dear et al. | 560/25 |
| 4,098,742 | 7/1978 | Mueller | 428/142 |
| 4,421,783 | 12/1983 | Marwitz et al. | 427/54.1 |
| 4,433,007 | 2/1984 | Marwitz et al. | 427/54.1 |
| 4,463,127 | 7/1984 | Alberts et al. | 524/731 |
| 4,469,840 | 9/1984 | Alberts et al. | 524/500 |
| 4,559,056 | 12/1985 | Leigh et al. | 8/581 |
| 4,739,013 | 4/1988 | Pinchuk et al. | 525/101 |
| 4,748,215 | 5/1988 | Lindner et al. | 525/479 |
| 4,851,176 | 7/1989 | Christiansen et al. | 264/268 |
| 4,851,475 | 7/1989 | Federici et al. | 528/21 |
| 4,935,480 | 6/1990 | Zdrahala et al. | 528/28 |
| 5,019,428 | 5/1991 | Ludemann et al. | 528/38 |

FOREIGN PATENT DOCUMENTS 298364 1/1989 European Pat. Off. .
WO86/02115 4/1986 PCT Int'l Appl. .

OTHER PUBLICATIONS

Patent Abstract of Japan-JP-A-60-81-278.
Product Bulletin-DD1 1410-Henkel Corp., Minneapolis, MN.

Primary Examiner—Melvyn I. Marquis
Attorney, Agent, or Firm—Marla J. Mathias; Edward McC. Roberts

[57] ABSTRACT

Modified polyurethanes containing perfluoroaliphatic groups which are obtained by reacting oligo(poly)urethanes containing free hydroxyl or isocyanate groups and perfluoroaliphatic groups with di/polyfunctional polysiloxanes at elevated temperatures with conversion of all the reactive groups of the urethane are used for the oil- and water-repellent finishing of fiber materials, conferring on these materials thus treated not only laundering- and drycleaning-stable effects but also in particular a very soft, full hand of very good surface smoothness, these excellent hand effects being further optimized by the addition of a polyethylene dispersion and-/or of further customary textile assistants, in particular water-repellent fluorocarbon compounds.

11 Claims, No Drawings

MODIFIED POLYURETHANES CONTAINING PERFLUOROALIPHATIC GROUPS AND USE THEREOF

This is a divisional of Ser. No. 301,681 filed Jan. 25, 1989, now U.S. Pat. No. 5,019,428.

The present invention relates to modified polyurethanes containing perfluoroaliphatic groups ($R_f$) and the use thereof for the oil- and water-repellent finishing of fiber materials. In addition, there is also described the conjoint use thereof together with textile assistants for the oil- and water-repellent finishing of fiber materials.

Polyurethanes which contain perfluoroaliphtic groups are already known in the art (U.S. Pat. Nos. 3,968,066 and 4,054,592). It is also known to use these compounds for the oil- and water-repellent finishing of fiber materials. These finishes, however, have the disadvantage that the water repellency is on the whole unsatisfactory. DE-A-2,802,392 in addition discloses polyurethanes composed of perfluoroalkyl-containing segments and siloxane-containing segments, these polyurethanes being usable for treating textiles. It is true that these finishing agents represent a certain improvement as far as the fabric hand is concerned, but they are likewise still unsatisfactory in respect of oil and especially water repellency and their laundering and drycleaning stability (see examples).

It has therefore already been proposed in PCT Application WO 86/02115 to remove this disadvantage by using selected extenders, namely NCO-containing compounds having a molecular weight of at least 450 in blocked form. Indeed, this addition brings about a laundering- and drycleaning-stable water repellency, but the fabric hand does not always meet present-day requirements, since the fabric hand obtainable by the prior art is frequently excessively dry and comes nowhere near the desired soft hand effect of inherent softness and pleasant fullness and surface smoothness.

We have now found modified polyurethanes which contain perfluoroaliphatic groups and which meet all the stated requirements.

The present invention thus provides the modified polyurethanes containing perfluoroaliphatic groups ($R_f$) described in more detail below.

The oligourethanes and/or polyurethanes used as starting compounds which contain free hydroxyl or isocyanate groups and perfluoroaliphatic groups (compounds 1) are in principle known from the cited prior art (U.S. Pat. Nos. 3,968,066 and 4,054,592). They are obtained by reacting diols which contain perfluoroaliphatic groups and have from 1 to 18, in particular from 6 to 16, carbon atoms in the perfluoroalkyl radical with di/polyisocyanates. Details may be found in the two cited U.S. patents. Particularly suitable diols with perfluoroaliphatic groups have proved to be those of the formula

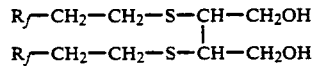

i.e. 2,3-bis(1,1,2,2-tetrahydroperfluoroalkylthio)butane-1,4-diols ($R_f$=-$C_{16}F_{33}$ to -$C_6F_{13}$). Suitable di-/polyisocyanates are in particular aliphatic diisocyanates, for example 1,6-hexamethylene diisocyanate or trimethylhexamethylene diisocyanates and isophorone diisocyanate and also a diisocyanate derived from a dimeric fatty acid containing 36 carbons (DDI ® 1410 from Henkel Corp.), including mixtures with one another. The formulations produced therefrom are free of self-color.

The crucial factor for the subject-matter of the invention, then, is that the equivalence ratio in the preparation of the oligo(poly)urethanes be chosen in such a way that, following the reaction, either free OH groups (compound 1a) or free NCO groups (compound 1b) remain. In addition, the reaction can be controlled within wide limits. For instance, usable starting substances for preparing the novel modified polyurethanes containing perfluoroaliphatic groups are obtained within the OH: isocyanate group ratio of from 3:2 to 15:14 as well as in the range from 2:3 to 14:15, consequently forming polyurethanes which contain perfluoroaliphatic groups and free OH or NCO groups by block formation, the latter being used particularly advantageously, since thereby the end reaction with the polysiloxanes is determinable in a simple manner, for example by IR spectroscopy.

The other starting compounds are di- or polyfunctional polysiloxanes (compounds 2). Depending on whether, then, compound (1) has free OH groups (compound 1a) or free NCO groups (compound 1b), different compounds (2) will be used. Suitable for the reaction with the free OH groups are in particular those having epoxy and carboxyl groups, and for this reason there are used as compounds (2) those polysiloxanes having at least two functional groups that contain such groups (compound 2 a), preferably in the $\alpha,\omega$-position. Free NCO groups by contrast react in particular with OH and amine or amide groups, so that compounds (1 b) should be reacted in particular with those compounds (2) which are OH-functional, in particular carbinol-functional (OH group bonded to silicon via carbon chain) or amine/amide-functional (compound 2b). Similarly, of compounds (2 b), those which are difunctional and have the functionality in the $\alpha,\omega$-position are again used preferably. Otherwise, the structure of the polysiloxanes is not subject to any particular conditions, other reactive groups being largely excluded and otherwise the customary constituents such as ethyl, phenyl and in particular methyl radicals being present. Examples of such compounds are without claim to completeness, $\alpha,\omega$-carbinol-functional dimethylpolysiloxane having a molecular weight of from 600 to 10,000, $\alpha,\omega$-epoxy-functional dimethylpolysiloxane having a molecular weight of from 600 to 10,000, $\alpha,\omega$-dihydroxy-functional dimethylpolysiloxane having a molecular weight of from 1200 to 15,000, silicones of the formula

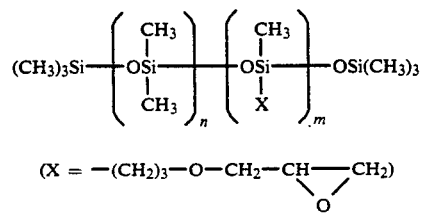

having a viscosity of from 30 to 100 mPa.s at 20° C.

Compounds (1 a) and (1 b) are preferably reacted with compounds (2 a) and (2 b) in such amounts that a small excess of the di/polyfunctional groups of the polysiloxane is present. However, it is perfectly possible to have the two reactants react in approximately equivalent amounts. In general, the reaction is carried out in an organic solvent, in particular in esters, such as butyl acetate, or in fluorinated hydrocarbons, such as hexafluoroxylene, thereby obtaining systems which give good further processing. The reaction itself may be carried out under atmospheric air pressure in the absence of atmospheric humidity, but preferably it is carried out under an inert gas, in particular nitrogen. The temperature during the reaction is from 30° to 160° C., in particular from 80° to 120° C. Without the use of a catalyst, the reaction takes a very long time to prepare the novel modified polyurethane which contains perfluoroaliphatic groups. It is therefore preferred to carry out this reaction in the presence of catalysts known from the literature. There may be mentioned as examples dialkyltin dicarboxylates, for example dibutyltin dilaurate, and tertiary amines, such as triethylamine and N-benzyldimethylamine. The duration of the reaction is dependent on the chosen conditions, but even under optimal conditions it still takes from 2 to 8 hours, the end point of reaction having been reached once free groups from starting compounds (1) are no longer present. Because free NCO groups are easy to determine, particular preference is given to reacting compounds (1 b) with compounds (2 b). The novel reaction products thus prepared can be used as such directly in the form of organic solutions for the oil and water-repellent finishing of fiber materials, in particular textile materials. However, the use of organic solvents, in particular halogenated hydrocarbons, has more and more critics, and therefore it is preferred to convert the products according to the invention into solvent-free, aqueous dispersions and use them in that form.

The dispersions are prepared in a conventional manner, and the skilled worker will have no problem here in choosing the right emulsifiers and the right method. For completeness, however, there may be mentioned some emulsifiers and also a standard method for preparing the dispersions. Suitable emulsifiers are—because of the subsequent use of the dispersions—particularly weakly cationic and nonionic emulsifiers, which are used in amounts of from 3 to 50%, in particular from 8 to 40%, based on solids. Examples of suitable emulsifiers are ethylene oxide adducts of fatty alcohols, in particular those of primary and/or secondary, linear or branched alcohols of from 8 to 16 carbon atoms and ethoxylated $C_6$-$C_{12}$-alkylphenols, the number of ethylene oxide units being between 5 and 30. Similarly suitable besides these are nitrogen-containing emulsifiers of the type formed by ethoxylation of fatty amines or fatty acid amides, which compounds may also be present in salt form following addition of an acid. Examples are 2,6,8-trimethyl-4-nonyloxyhexaethyleneoxyethanol, isotridecyl ethoxylate with on average 8 ethylene oxide units and hexadecylamine ethoxylated with on average 15 moles of ethylene oxide in the form of the acetate.

To prepare the aqueous dispersions, in general the water and the emulsifier are mixed, and the mixture is heated to about 60° to 80° C., and the reaction product according to the invention, which has been heated to approximately the same temperature and may be from its preparation in the form of a solution, is mixed in with a turbine mixer. Thereafter the resulting predispersion is homogenized at from 40° to 60° C. under elevated pressure in a high-pressure homogenizing apparatus. Finally, any solvent still present from the preparation is drawn off under reduced pressure. The dispersions obtained contain about 10 to 40% by weight of active substance.

The aqueous dispersions thus obtained are like the organic solutions of the reaction products according to the invention highly suitable for the oil-in-water repellent finishing of fiber materials, in particular textiles. The amounts used therein are chosen in such a way, assuming a customary liquor pickup, that the finishing baths contain about 1.5 to 4.5 g/l of fluorine, which customarily corresponds to a use amount of 15 to 100 g/l for the dispersions prepared as described. The finishing itself is effected in a known manner, predominantly by padding, drying and condensing, although spraying is also particularly suitable.

According to the invention, it is surprisingly possible to obtain with only a single component very good, dry-cleaning- and laundering-stable oil- and water-repellency and at the same time a surface-smooth hand of particular inherent softness on any customary fiber material. By combining perfluoroalkylpolyurethane blocks of varying size with silicones of varying molecular weight it is possible to vary the effects and the fabric hand ad libitum.

It is here additionally possible to improve the product according to the invention by a further considerable amount as regards fabric hand by adding to the above-prepared dispersions themselves or to the aqueous liquors prepared therefrom from 15 to 100% by weight, in particular from 30 to 50% by weight, each percentage being based on the dispersion of the reaction product according to the invention, of a 20 to 35% strength dispersion of an emulsifiable polyethylene (polyethylene wax) having a density (at 20° C.) of at least 0.92 g/cm$^3$ and an acid number of at least 5. This emulsifiable polyethylene (polyethylene wax) usable here is known and described at length in the prior art (DE-C-2,359,966, DE-A-2,824,716 and DE-A-1,925,993). In general, the emulsifiable polyethylene is a polyethylene with functional groups, in particular COOH groups, which may be partly esterified. These functional groups are introduced by oxidizing the polyethylene. However, it is also possible to obtain the functionality by copolymerization of ethylene with, for example, acrylic acid. The emulsifiable polyethylenes usable for the purposes of the present invention have at 20° C. a density of at least 0.92 g/cm$^3$ and an acid number of at least 5. Particular preference is given to using those emulsifiable polyethylenes in the form of dispersions for the purposes of the present invention which have a density at 20° C. of 0.95 to 1.05 g/cm$^3$, an acid number of 10 to 60 and a saponification number of 15 to 80. This material is commercially available in general in the form of flakes, pastilles or the like. The preparation of dispersions from this material is described at length in the prior art.

It will be readily understood that for the purposes of the present invention the finishing baths may be admixed with further assistants customary in the textile industry. There may be mentioned in this context in particular crease resist agents, since they bring about not only the desired crease resistance but also in addition a certain stabilization of the effects. Other additive products which, however, may also be mentioned are filling resins, flameproofing agents, non-slip agents and similar products and also any catalysts which may be necessary, all additives in customary amounts.

In a particular embodiment of the present invention, it has been found to be advantageous to use as textile assistants water-repellent fluorocarbon compounds together with the aqueous dispersions of the modified polyurethanes which contain perfluoroaliphatic groups. These water-repellent fluorocarbon compounds are in general present in aqueous dispersion and have a solids content of about 20 to 65% by weight, in particular 40 to 60% by weight, and a fluorine content of at least 5% by weight, in particular at least 7% by weight, based on the dispersion. Particularly suitable water-repellent fluorocarbon compounds are polymers/copolymers which contain perfluoroaliphatic groups and which are likewise present in aqueous dispersion. These dispersions are customarily of nonionic character, and the (co)polymers are prepared by polymerization of known monomers which contain perfluoroaliphatic groups, in particular acrylate monomers, together with other known fluorine-free monomers, in which case the fluorine content of the ready-prepared dispersion should be at least 5% by weight. Particularly suitable products have proved to be ®SCOTCHGARD FC 461 with 8% of fluorine (3M Company) and ®ASAHI GUARD AG 310 with about 9% of fluorine (Asahi Glass). These water-repellent fluorocarbon compounds in aqueous dispersion are added to the treatment liquors in amounts of 5 to 40 g/l, in particular 7 to 25 g/l.

It is here perfectly possible to compound the customary textile assistants, but in particular the water-repellent fluorocarbon compounds, and the modified polyurethanes which contain perfluoroaliphatic groups and to use the compounded composition, taking into account the corresponding mixing ratios.

The products according to the invention can be used as in the existing processes to finish fiber materials of any kind. Suitable fiber materials here are in particular textiles, especially those textiles consisting of or at least in part containing cellulose fibers. As additional fibers besides the cellulose there are possible in these textiles not only synthetic fibers, such as polyester, polyamide or polyacrylonitrile fibers, but also wool. Of course, the novel modified polyurethanes which contain perfluoroaliphatic groups may also be used for finishing pure synthetic fiber and wool fiber materials. A particularly critical application is the oil- and water-repellent finishing of cotton/polyester blend fabrics. Here too the products according to the invention perform very well.

According to the latest art cited (PCT Application WO 86/02115), very good oil- and water-repellent properties which are also completely laundering- and drycleaning-stable are obtained. Compared with this prior art, the subject-matter according to the invention shows no shortcomings as regards the effects, the effect level of the existing finishing processes being obtained without restrictions. The distinct superiority of the subject-matter of the application here resides in a critical improvement in the hand of the finished textile materials. While the prior art gives only a comparatively harsh and especially also a dry hand, the novel use of the products according to the invention confers on the treated materials a soft, full hand of very good surface smoothness, thus achieving a typical soft hand effect. This already very high level of fabric hand can be improved still further by adding emulsified polyethylenes to the products themselves or the liquors. This is because in this way the inherent softness can be additionally improved and the fulness and surface smoothness optimized in a particular manner without giving rise to an impairment in the laundering- and drycleaning-stable oil- and water-repellency; on the contrary, these values are somewhat raised.

By using the water-repellent fluorocarbon compounds in the context of the present invention, the oil- and water-repellent effects are further increased by a small amount and—this is a particular advantage—the laundering stability of these effects is markedly improved. These good effects are obtained although only a small amount of fluorine compounds (based on fluorine) is used. However, it must be emphasized as a particular advantage that the liquor stability is very high. More particularly, it has to be noted, surprisingly, that, even if silicone-containing products are used, stable liquors and in particular reliable original values of good laundering stability are obtained.

It must be regarded as particularly surprising here that by nothing more than the above-described silicone modification of the perfluoroalkyl-containing polyurethanes (compounds 1), i.e. in the absence of a customarily used extender, it was possible to bring the totality of the effects to a high level, since it was known to the skilled worker that the effect of using silicone extenders as part of a combined finish is to lose substantially all the oil repellency.

The present invention is described in more detail in the examples below, where parts and percentages are by weight.

PREPARATION OF THE PERFLUOROALKYLDIOL

In a heatable and coolable vessel equipped with a stirrer, a thermometer, a reflux condenser and a funnel, 1012.4 parts of 2-(perfluoroalkyl)ethanethiol (on average $C_{10}F_{21}$-in the $R_f$ radical) and 75.2 parts of 2-butyne-1,4-diol are mixed under nitrogen, 278 parts of hexafluoro-m-xylene are then added, likewise under nitrogen, and the mixture is heated to 60° C. After the mixture has turned into a solution, a catalyst solution (solution of 39.2 parts of azobis(2,4-dimethylvaleronitrile) in 50 parts of methylene chloride) is added a little at a time (1.6 ml per 5 minutes) in the course of 4 hours, during which a distinct temperature increase to above 76° C. occurs after 1 hour. After all the catalyst has been added, the mixture is stirred at 60° C. for a further 4 hours until the reaction ends. The product obtained is about 75% strength in bisperfluoroalkyldiol and has a fluorine content of about 45%.

EXAMPLE 1

In an appropriately dimensioned 4-neck flask equipped with a reflux condenser (with a drying tube), nitrogen supply means, a thermometer and a stirrer, the following starting substances are mixed with one another:

33.4 parts of the above-prepared perfluoroalkyldiol solution, 3.2 parts of trimethylhexamethylene diisocyanate (isomer mixture), 9.2 parts of DDI ®-1410 diisocyanate, 28.8 parts of butyl acetate and 0.15%, based on the above mixture, of catalyst solution (dibutyltin dilaurate and triethylamine in a mixing ratio of 4:1, 10% strength in butyl acetate). This mixture is stirred at 90° C. under nitrogen for 4 hours (block formation in the OH: isocyanate group equivalence ratio of 2:3), 10 parts of polysiloxane (α,ω-carbinol-functional dimethylpolysiloxane having a molecular weight of about 1000 and

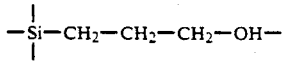

end groups, viscosity about 45 mPa.s, refractive index $n_D^{25}$ about 1.415 and OH number 110) and 10 parts of butyl acetate are then added, followed by the same amount of the abovementioned catalyst solution, and the mixture is stirred at 90° C. for a further 4 hours. The product no longer has any NCO groups.

For emulsification, 80 parts of the above solution are mixed at 70° C. by means of a turbine mixer into a 70° C. mixture of 250 g of water, 4 g of emulsifier (dodecyloxypropylamine ethoxylated with on average 12 moles of ethylene oxide in the form of acetate) and 24 g of ethylglycol and the mixture is homogenized at 50° to 60° C. under 300 bar on a high pressure homogenizing apparatus. Thereafter the solvent is drawn off in a rotary evaporator to leave a dispersion having a solids content of 17.8% (fluorine content 5.25%).

EXAMPLE 2

In the same apparatus as described in Example 1,
66.8 parts of the above perfluoroalkyldiol,
10.7 parts of trimethylhexamethylene diisocyanate (isomer mixture),
43.8 parts of butyl acetate and
0.18%, based on the above mixture, of the catalyst solution mentioned in Example 1 are reacted at 90° C. under nitrogen for 4 hours (end point determined by check for absence of NCO groups), 80 parts of polysiloxane (chemical structure as for the polysiloxane having a molecular weight of about 8000 described in Example 1) and 80 parts of butyl acetate are then added, followed once more by the same amount of catalyst solution, and the mixture is reacted at 100° C. for 6 hours. A 20% strength dispersion is prepared in the same way as described in Example 1, if necessary by filling up with water.

EXAMPLE 3

Example 1 is repeated using the following amounts of compounds for the first reaction step: 116.7 parts of the perfluoroalkyldiol mentioned, 8.4 parts of the diisocyanate mentioned, 24.5 parts of DDI ®-1410 diisocyanate and 90.7 parts of butyl acetate. All the procedural methods and other starting compounds conform to Example 1 (block formation in an OH:NCO group equivalence ratio of 7:8).

The solids content is standardized to 20% to give a dispersion containing 7.17% of fluorine.

EXAMPLE 4

In the apparatus described in Example 1,
83.5 parts of the above-prepared perfluoroalkyldiol,
24.5 parts of DDI ®-1410 diisocyanate,
65.8 parts of butyl acetate,
0.23 parts of a 10% strength solution of dibutyltin dilaurate in butyl acetate and 0.06 part of a 10% strength solution of triethylamine in butyl acetate are added together and heated with stirring to 80° C. under nitrogen. After 3 hours, free NCO groups were no longer detectable (equivalence ratio in the block polymer OH: isocyanate groups 5:4).

10 parts of polysiloxane (α,ω-epoxy-functional dimethylpolysiloxane having a molecular weight of about 1000), 10 parts of butyl acetate and 0.5 part of a 10% strength solution of triethylamine in butyl acetate are then added, and the mixture is likewise heated with stirring under nitrogen to 80° C. After a reaction time of in total 9 hours the mixture has reacted in full, and there is no further detectable change in the epoxy number. To prepare an aqueous dispersion, 80 parts of the product prepared as described are mixed hot, at 70° C., by means of a turbine mixer into the mixture described in Example 1 (likewise at a temperature of 70° C., but containing as the emulsifier 4 g of an ethoxylated $C_{16-18}$ fatty alcohol with 25 moles of ethylene oxide per mole of fatty alcohol), and a ready-prepared, bluish dispersion is obtained at 50° to 60° C. on a high-pressure homogenizing machine under 300 bar.

The solvent is then drawn off in a rotary evaporator and water is added to standardize the solids content to 20% (fluorine content 5.9%).

EXAMPLE 5

0.04 mole of a perfluoroalkyldiol (see Example 40 of U.S. Pat. No. 4,054,592) is reacted as described in Example 1 with 0.025 mole of isophorone diisocyanate and 0.025 mole of 1,6-hexamethylene diisocyanate under nitrogen (block formation in an OH:NCO group equivalence ratio of 4:5).

To this mixture are added at 90° C. with stirring 25 g of polysiloxane (α,ω-epoxy-functional dimethylpolysiloxane having a molecular weight of about 2500 and a refractive index $n_D^{25}$ of about 1.4090), 25 g of butyl acetate and 0.12%, based on the total mixture, of the catalyst solution specified in Example 1. After 3 hours at 90° to 110° C. NCO groups are no longer detectable by IR spectroscopy. The directions of Example 1 are followed to prepare an approximately 18% strength dispersion using nonylphenol polyglycol ether (5 moles of ethylene oxide per mole of nonylphenol) as emulsifier.

EXAMPLE 6

Example 1 is repeated using 6.4 parts of trimethylhexamethylene diisocyanate and 23 parts of butyl acetate (1st reaction step) (block formation in an OH:isocyanate group equivalence ratio of 2:3) and 43.4 parts of a 2:1 mixture of α,ω-carbinol-functional dimethylpolysiloxane of molecular weight 2500 (2 parts) or 8000 (1 part), each with

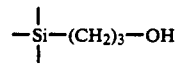

end groups and 43.4 parts of butyl acetate (2nd reaction step). The emulsification is effected as described in Example 1 to give a 30% strength dispersion (5.51% of fluorine).

FINISHING EXAMPLE 1

A dark blue cotton twill (about 170 g/m²) and a blue polyester/cotton coat poplin 67/33 (about 210 g/m²) are padded with liquor A to C specified hereinafter (liquor pickup about 69% and 63% respectively), dried at 110° C. for 10 minutes and condensed at 150° C. for 5 minutes.

LIQUOR A 1

20 g/l of an approximately 70% strength aqueous amino resin solution (contains methanol-etherified dimethyloldihydroxyethyleneurea and about 5% of neutral salt), 20 g/l of an apporoximately 50% strength aqueous solution of pentamethylolmelamine methyl ether, 6 g/l of a 30% strength zinc nitrate solution (pH about 1.0), 1 g/l of 60% strength acetic acid and 51 g/l of the dispersion of Example 3.

LIQUOR A 2

Same as liquor A 1 with 50 g/l of dispersion of Example 6 (same fluorine content as liquor A 1).

LIQUOR B

Same as liquor A with 61 g/l of emulsion B of Example 1 of PCT Application WO 86/02115 (same fluorine content as liquor A).

LIQUOR C

Same as liquor A with 30 g/l of a commercially available polymer dispersion based on perfluoroalkyl acrylate (®SCOTCHGARD FC 251 from 3M Company) used at the same fluorine concentration.

The results of the finishing tests are summarized in the tables below, the washes comprising customary 60° C. or 40° C. household machine washed and the dry-cleaning runs (DCR) having been carried out in the presence of 2 g/l of a customary cleaning booster and 2 g/l of water (liquor ratio 10:1). The measurements were carried out after 5 days of conditioning in a standard atmosphere. The oil repellency was determined in accordance with AATCC 118-1972, the water repellency in accordance with German Standard Specification DIN 53888 (a=water uptake in %; b=bead-off effect), and the spray test in accordance with AATCC 22-1974. The soft hand effect was rated along the following scale:

HAND ASSESSMENT RATINGS

1 = dry, harsh hand
2 = dry, somewhat harsh hand
3 = moderate, somewhat full soft hand
4 = good, somewhat surface-smooth soft hand
5 = good to very good, bulky, surface-smooth soft hand
6 = very good to excellent soft hand with pleasant fullness and surface smoothness.

| | (1) Cotton fabric | | | | | | | | |
|---|---|---|---|---|---|---|---|---|---|
| | Original | | | | 5 × 60° C. Wash | | 1 × DCR | Hand | After 5 × 60° C. |
| | a | b | Spray | Oil | Spray | Oil | Spray | Oil | Original | wash |
| Liquor A 1 (according to the invention) | 4,6 | 5 5 5 | 3 × 100 | 5 | 3 × 100 | 4-5 | 3 × 100 | 4-5 | 4 | 4 |
| | | | | | | | | | (soft hand effect) | |
| Liquor A 2 (according to the invention) | 9,6 | 5 5 5 | 3 × 100 | 4-5 | 3 × 100 | 4-5 | 3 × 100 | 4-5 | 5-6 | 5 |
| Liquor B (prior art) | 7,4 | 5 5 5 | 3 × 100 | 4-5 | 3 × 100 | 4-5 | 3 × 100 | 4-5 | 2 | 2 |
| Liquor C (prior art) | 11,8 | 4 4 4 | 3 × 100 | 4-5 | 100 100-90 100-90 | 4 | 100 100 100-90 | 4 | 1-2 | 2 |
| untreated | 102 | 1 | 0 | 0 | — | | — | | — | — |

| | (2) Cotton/polyester blend fabric | | | | | | | | |
|---|---|---|---|---|---|---|---|---|---|
| | Original | | | | 5 × 40° C. Wash | | 1 × DCR | Hand | After 5 × 40° C. |
| | a | b | Spray | Oil | Spray | Oil | Spray | Oil | Original | wash |
| Liquor A 1 (according to the invention) | 2,5 | 5 5 5 | 3 × 100 | 4-5 | 3 × 100 | 4-5 | 3 × 100 | 4-5 | 4 | 4 |
| | | | | | | | | | (soft hand effect) | |
| Liquor A 2 (according to the invention) | 3,9 | 5 5 5 | 3 × 100 | 4-5 | 3 × 100 | 4-5 | 3 × 100 | 4-5 | 5-6 | 5 |
| Liquor B (prior art) | 3,3 | 5 5 5 | 3 × 100 | 4-5 | 3 × 100 | 4-5 | 3 × 100 | 4-5 | 2 | 2 |
| Liquor C (prior art) | 5,9 | 5 4 4 | 3 × 100 | 3-4 | 100 100-90 100-90 | 3-4 | 3 × 100 | 3-4 | 1-2 | 2 |
| untreated | 51 | 1 | 0 | 0 | — | | — | | — | — |

FINISHING EXAMPLE 2

The polyester/cotton coat poplin mentioned in Finishing Example 1 is finished with a liquor conforming to Finishing Example 1, except that the dispersion of Example 3 is replaced by the same amount of a dispersion of Example 1 (liquor A) and in addition 20 g/l of commercially available, nonionic, finely divided, aqueous 20% strength polyethylene wax dispersion (50% nonylphenol ethoxylated with 15 moles of ethylene oxide, based on polyethylene wax, as emulsifier; polyethylene wax having a density of about 1 g/cm$^3$ at 20° C., acid number 13, saponification number about 22; liquor B) is used.

The results of these finishing tests are summarized in the following table:

|  | Original | | 5 × 60° C. Wash | | 1 × DCR | |
|---|---|---|---|---|---|---|
|  | a | b | Spray | Oil | Spray | Oil | Spray | Oil |
| Liquor (A) (according to the invention) | 10 | 5 5 5 | 3 × 100 | 4-5 | 3 × 100 | 4-5 | 3 × 100 | 4 |
| Liquor (B) (according to the invention) | 7 | 5 5 5 | 3 × 100 | 5 | 3 × 100 | 4-5 | 3 × 100 | 4 |
| Hand | Original | | after 5 × 40° C. was | | | |
| (A) | 5(−6) | | 5-6 | | | |
| (B) | 6+ | | 6 | | | |
|  | (very good soft hand effect) | | | | | |

By using polyethylene wax dispersions the hydrophobic/oleophobic effects are stabilized and in particular a further noticeable improvement in the hand effects is obtained.

FINISHING EXAMPLE 3

A black-dyed cotton/polyester blend fabric (33/67 at 130 g/m$^2$) is padded with liquors A to C specified hereinafter, squeezed off to a liquor pickup of 57%, dried at 100° C. for 10 minutes and then condensed at 150° C. for 5 minutes.

LIQUOR A 2.4 g/l of an approximately 70% strength aqueous commercially available cellulose crosslinker (mixture of dimethyloldihydroxyethyleneurea and methanoletherified pentamethylolmelamine 5:1) (I), 1.6 g/l of an aqueous, weakly acid 55% strength zinc chloride solution (II), 5.2 g/l of a commercially available nonionic extender based on fat-modified melamine resin (active substance about 12%) (III), 2 ml/l of 60% strength acetic acid (IV), 16 ml/l of a commercially available alcoholic wetting agent (V), 12.5 g/l of ASAHI GUARD AG 310 (VI) and 12.5 g/l of the dispersion of the modified polyurethane prepared in accordance with Example 3 (VII).

LIQUOR B

Same as liquor A, with 10 g/l each of components (VI) and (VII).

LIQUOR C

Same as liquor A, with 7.5 g/l of components (VI) and (VII).

The oil- and water-repellent values obtained after 8 days of conditioning in a standard atmosphere (oil repellency determined in accordance with AATCC 118-1972 and water repellency by the spray test conforming to AATCC 22-1974) are summarized in the following table:

|  | Oil repellency | | Spray test | |
|---|---|---|---|---|
| Liquor | Original | 1 × 50° C. machine wash | Original | 1 × 50° C. machine wash |
| A | 4-5 | 4 | 3 × 100 | 3 × 100 |
| B | 4-5 | 4 | 3 × 100 | 3 × 100 |
| C | 4-5 | 4 | 3 × 100 | 3 × 100 |
| untreated | 0 | — | 0 | 0 |

Despite the very low quantities of fluorine chemicals used, good to very good oil- and water-repellent effects are obtained, of which in particular the good, bulky, surface-smooth soft hand of the treated textiles is also notable.

FINISHING EXAMPLE 4

The same method as described in Finishing Example 3 is used to treat a gray cotton/polyamide blend fabric (33/67 at 110 g/m$^2$) with the following liquor (liquor pickup 55%):

10 g/l of a nonionic emulsion containing about 30% of an amino-functional α,ω-dihydroxydimethylpolysiloxane, 20 g/l of a cationic dispersion containing about 22% of a commercially available oxidized polyethylene, 34 g/l of the extender used in Finishing Example 3, 0.5 ml/l of 60% strength acetic acid, 3 g/l of a 20% strength aqueous solution of octadecyloxymethylpyridinium chloride and 30 g/l of a 1:1 mixture of ASAHI GUARD AG 310 and the dispersion of the modified polyurethane prepared according to Example 3.

The excellent oil- and water-repellent effects are shown in the following table:

|  | Oil repellency | | Spray test | |
|---|---|---|---|---|
|  | Original | 1 × 50° C. machine wash | Original | 1 × 50° C. machine wash |
| finish according to the invention | 4-5 | 4 | 3 × 100 | 3 × 100 |
| untreated | 0 | — | 0 |  |

The finished fabrics have a very good soft hand of pleasant fullness and surface smoothness.

We claim:

1. A modified polyurethane obtained by reacting a first compound and a second compound at elevated temperature, the first compound being an oligourethane or a polyurethane containing free hydroxyl or isocyanate groups and perfluoroaliphatic groups and the second compound being a polysiloxane containing at least two functional groups capable of reacting with the free hydroxyl or isocyanate groups of the first compound, the first and second compounds being reacted in an amount such that all of the free hydroxyl or isocyanate groups of the first compound react with a functional group of the second compound.

2. A modified polyurethane obtained by a process of claim 1 wherein the first compound is a oligourethane or polyurethane containing free hydroxy groups and perfluoroaliphatic groups and the second compound is a polysiloxane containing epoxy or carboxyl groups as the functional groups.

3. A modified polyurethane obtained by a process of claim 2 wherein the second compound is a $\alpha,\omega$-substituted polysiloxane.

4. A modified polyurethane obtained by a process of claim 1 wherein the first compound is an oligourethane or a polyurethane containing free isocyanate groups and perfluoroaliphatic groups and the second compound is a polysiloxane containing hydroxyl, amine or amide functional groups.

5. A modified polyurethane of claim 4 wherein the second compound is a $\alpha,\omega$-substituted polysiloxane.

6. A modified polyurethane as claimed in any one of claims 4 or 5, wherein the first compound is obtainable by reacting a diol which contains a perfluoroaliphatic group having from 1 to 18 carbon atoms with a diisocyanate or a polyisocyanate or a mixture thereof, with block formation, in such amounts that the ratio of the number of hydroxyl groups on the diol to the number of isocyanate groups on the diisocyanate or polyisocyanate is from 2:3 to 14:15.

7. A modified polyurethane obtained by a process of claim 1 wherein the first and second compounds are reacted at a temperature of from 30° to 180° C.

8. A modified polyurethane obtained by a process of claim 7 wherein the first and second compounds are reacted at a temperature of from 80° to 120° C.

9. A modified polyurethane obtained by a process of claim 1 wherein there is a small excess of the functional groups of the second compound over the free hydroxyl groups or isocyanate groups of the first compound.

10. A modified polyurethane obtained by a process of claim 1 wherein the first compound and the second compound are reacted under an inert gas atmosphere.

11. A modified polyurethane obtained by a process of claim 1 wherein the first compound and the second compound are reacted in the presence of a catalyst.

* * * * *